United States Patent

Goto

[15] 3,658,486
[45] Apr. 25, 1972

[54] PROCESS FOR THE PURIFICATION OF YTTRIUM BY SOLVENT EXTRACTION

[72] Inventor: Totaro Goto, Tokyo, Japan

[73] Assignee: Agency of Industrial Science of Technology, Tokyo, Japan

[22] Filed: Aug. 26, 1969

[21] Appl. No.: 853,030

[30] Foreign Application Priority Data

Aug. 27, 1968    Japan..................................43/60912

[52] U.S. Cl. ................................23/312 ME, 23/18, 23/22, 23/24, 23/340, 23/341
[51] Int. Cl. ....................................B01d 11/00, C01g 57/00
[58] Field of Search......................23/312, 339, 340, 341, 15, 23/18, 19, 22, 23, 24, 309

[56] References Cited

UNITED STATES PATENTS

| | | | |
|---|---|---|---|
| 2,812,233 | 11/1957 | Lewis | 23/312 ME |
| 3,110,556 | 11/1963 | Peppard | 23/312 ME |
| 3,192,012 | 6/1965 | Rice | 23/312 ME |
| 3,259,472 | 7/1966 | Rice | 23/312 ME |
| 3,278,277 | 10/1966 | Goren | 23/312 ME |
| 3,378,352 | 4/1968 | Hansen | 23/312 ME |
| 3,409,415 | 11/1968 | Moore | 23/312 ME |
| 3,429,694 | 2/1969 | Lower | 75/117 |

Primary Examiner—Norman Yudkoff
Assistant Examiner—S. J. Emery
Attorney—Kurt Kelman

[57] ABSTRACT

This invention relates to a process for the purification of yttrium which comprises adding ammonium thiocyanate to an impure aqueous solution of yttrium containing as contaminants mainly heavy rare earth elements as impurities, further adding to the resulting mixture, as a solvent, a quaternary ammonium salt containing cyclohexyl radicals, straight chain alkyl radicals and at least one methyl radical but containing no aryl radical, or a composite solvent system consisting of a quaternary ammonium salt and a trialkylphosphine oxide or a triarylphosphine oxide, and extracting the heavy rare earth elements in said aqueous solution into the solvent phase thereby leaving the yttrium in the aqueous phase.

2 Claims, 3 Drawing Figures

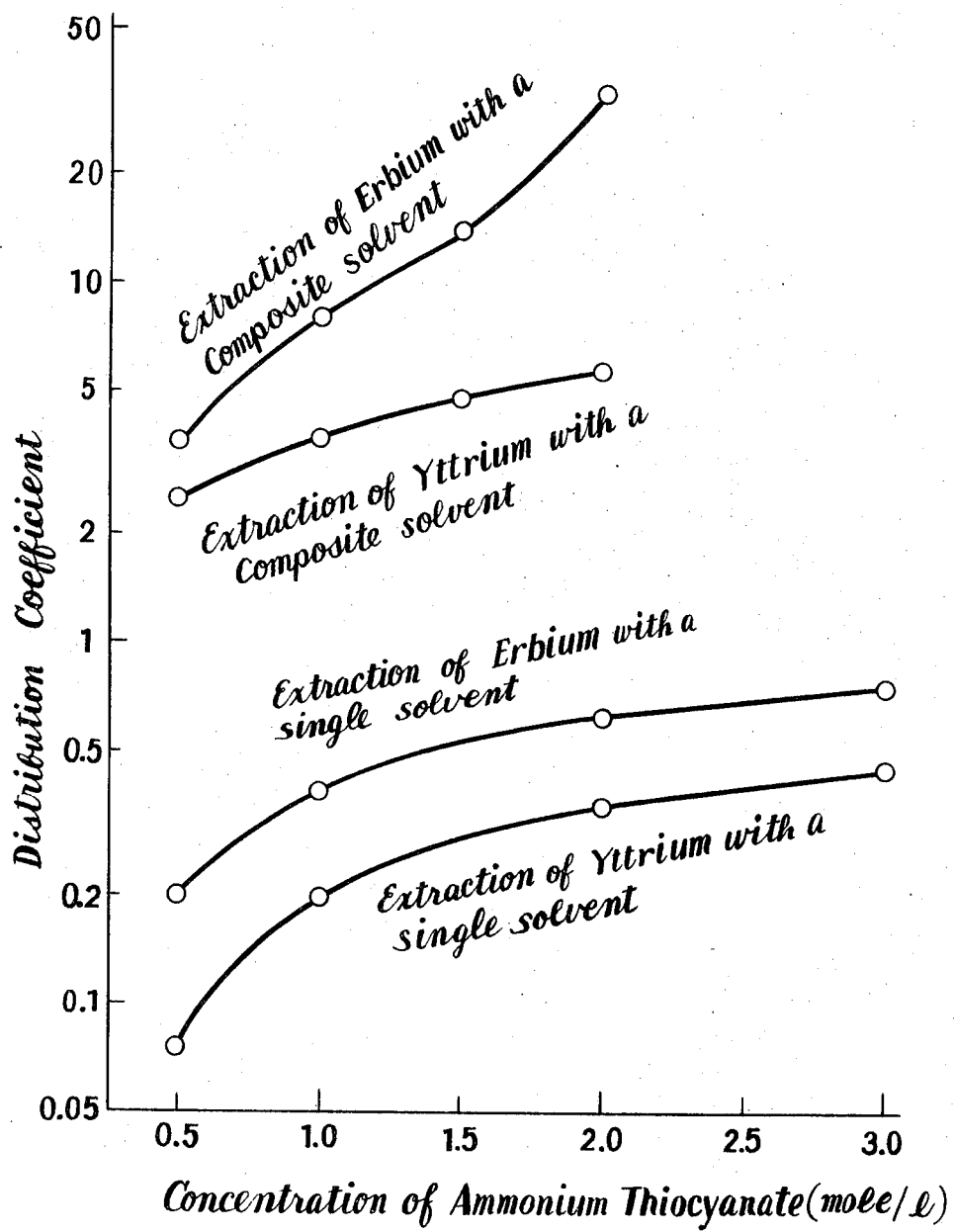

3,658,486

PROCESS FOR THE PURIFICATION OF YTTRIUM BY SOLVENT EXTRACTION

This invention relates to a process for the purification of yttrium by the solvent extraction using a quaternary ammonium salt as a solvent. More particularly, this invention relates to a process for the purification of yttrium which comprises adding ammonium thiocyanate to an impure aqueous solution of yttrium containing as contaminants mainly heavy rare earth elements as impurities, further adding to the resulting mixture, as a solvent, a quaternary ammonium salt containing cyclohexyl radicals straight chain alkyl radicals and at least one methyl radical but containing no aryl radical, or a composite solvent system consisting of a quaternary ammonium salt and a trialkylphosphine oxide or a triarylphosphine oxide, and extracting the heavy rare earth elements in said aqueous solution into the solvent phase thereby leaving the yttrium in the aqueous phase.

At present, the demand of highly pure yttrium oxide for use in color television sets, communication equipment, electric lamps and the like is increasing at a remarkable rate. Yttrium is obtained together with other rare earth elements which must be separated from the yttrium. However, yttrium possesses chemical properties which are similar to those of the other rare earth elements, making it very difficult to separate the yttrium therefrom.

Yttrium oxide of high purity is at present produced, in most cases, by using an ion-exchange resin, but this method requires a large amount of the ion-exchange resin and an expensive chelating agent. Further, the ion-exchange process is operated at very low concentrations of yttrium, and requires much time for separation.

On the other hand there are no such disadvantages in the solvent extraction method proposed in this invention and, since the concentration of the yttrium to be treated in said method is 10 – 100 times higher than that in the ion-exchange method, it provides an aqueous solution of yttrium at higher concentrations.

Unfortunately, most of the solvent extraction methods which have been disclosed up to date are effective only for the separation of yttrium from lighter rare earth elements (those having atomic numbers less than that of gadolinium), and there has been developed no method effective for the separation of heavier rare earth elements (those having a greater atomic numbers than those of the lighter rare earth elements) which are particularly difficult to remove.

The object of this invention is to provide a process for easily separating yttrium from the rare earth elements, in particular, heavy rare earth elements, and for the purification of yttrium in a short period of time.

Another object of this invention is to provide a process for economically purifying a large amount of yttrium.

Other objects and features of the present invention will be understoods by referring to the attached drawings and the explanation given hereinafter.

FIG. 3 is a graph showing the relationship between the concentration of ammonium thiocyanate and the distribution coefficients of erbium and yttrium by using a single solvent consisting of 0.2 mole tri-n-octylmethyl ammonium salt and a composite solvent consisting of 0.2 mole tri-n-octylmethyl ammonium salt and 0.2 mole tri-n-octylphosphine oxide.

Figure 1:
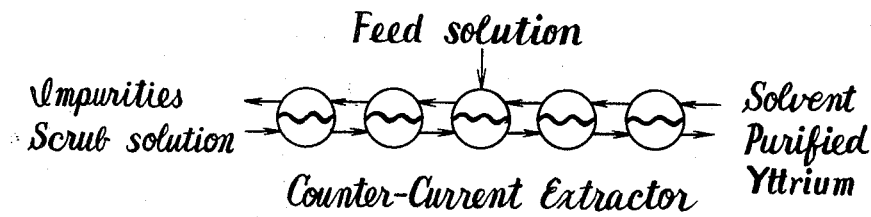
FIG. 1 is a schematic drawing showing the direction of flow of the feed solution, the solvent, the scrub solution, impurities and a purified yttrium when a crude yttrium is purified by means of a counter-current extracting apparatus having five theoretical stages consisting of five extractors connected in series.

The Present inventor carried out search for an extracting solvent which would make possible the extraction of rare earth elements, particularly heavy rare earth elements from crude yttrium and found that a quaternary ammonium salt containing cyclohexyl radicals, straight alkyl radicals and at least one methyl radical but containing no aryl radical is highly effective for such a purpose.

The present inventor also found that the efficiency of the extraction of the heavy rare earth elements can be increased and, at the same time, the selectivity for yttrium with respect to the rare earths can be improved by using a composite solvent consisting of the above quaternary ammonium salt admixed with a trialkylphosphine oxide or a triarylphosphine oxide.

TABLE 1

| Component | % Composition of Crude Yttrium Oxide | Component | % Composition of Crude Yttrium Oxide |
|---|---|---|---|
| $Y_2O_3$ | 64.9% | $Gd_2O_3$ | 3.4% |
| $La_2O_3$ | 2.3% | $Tb_4O_7$ | 0.91% |
| $CeO_2$ | 3.6% | $Dy_2O_3$ | 8.2% |
| $Pr_6O_{11}$ | 0.17% | $Ho_2O_3$ | 2.0% |
| $Nd_2O_3$ | — | $Er_2O_3$ | 8.4% |
| $Sm_2O_3$ | 1.3% | $Yb_2O_3$ | 4.9% |
| $Eu_2O_3$ | — | | |

Crude yttrium oxide having the composition shown in Table 1 above is dissolved in hydrochloric acid, and the resulting solution is used to prepare a 0.1 mole aqueous solution of a chloride (pH, 3 – 5) which also contains 1 mole ammonium thiocyanate. To the resulting solution is added 0.25 mole of various quaternary ammonium chlorides dissolved in toluene at room temperature, and the lanthanide in the thus prepared solution is extracted. The results are as shown in Table 2 below.

TABLE 2

| Quaternary Ammonium Salt | % Extraction |
|---|---|
| 1. Tri-n-octylmethyl ammonium | 17.0 |
| 2. Cyclohexyl-di-n-octylmethyl ammonium | 26.0 |
| 3. Cyclohexyl-di-n-dodecylmethyl ammonium | 26.2 |
| 4. Cyclohexyl-di-n-octylethyl ammonium | 11.8 |
| 5. Cyclohexyl-di-n-octylbutyl ammonium | 4.0 |
| 6. Tri-(2-ethylhexyl)methyl ammonium | 12.7 |
| 7. Dodecyl-n-octylbenzyl ammonium | 1.7 |
| 8. Dibenzyldidodecyl ammonium | 2.0 |

In Table 2, an extraction of 17.0 percent is obtained with tri-n-octylmethyl ammonium, and the percent extraction increases to 26.0 percent by substituting a cyclohexyl radical for one of the n-octyl radicals. Also, the percent extraction does not significantly vary by substituting a dodecyl radical for a n-octyl radical. This indicates that the increase in the percent extraction depends upon the presence of the cyclohexyl radical. On the other hand, the percent extraction decreases when the methyl radical of cyclohexyl-di-n-octyl ammonium salt is replaced by an ethyl or butyl radical. This indicates that at least one radical of the four radicals composing the quaternary ammonium salt should be a methyl radical. The percent extraction also decreases when the n-octyl radical is replaced by a 2-ethylhexyl radical, indicating that the straight chain is preferred to a branched chain. Other quaternary ammonium salts such as those containing a phenyl radical are difficult to synthesize, and also the percent extraction decreases when a benzyl radical is substituted. The cyclohexyl-di-n-octylmethyl ammonium salt used as a solvent is soluble in pure water up to about 0.5 percent and would apparently bring about a considerable loss of the solvent. However, this is not true in the actual extraction, since the solubility of the solvent significantly decreases by a salting-out effect due to the co-existance of ammonium thiocyanate and ammonium chloride. For example, the loss of the solvent is usually less than 10 ppm in the presence of 0.5 mole rare earth chlorides, 2 mole ammonium chloride and 3 moles ammonium thiocyanate.

In summary of the foregoing discussion, it is clear that the quaternary ammonium salts containing cyclohexyl radicals, at least one methyl radical and straight alkyl radicals but containing no aryl radical possess a superior ability to extract the rare earths.

Next, typical quaternary ammonium salts are studied for the in ability to separate heavy rare earths from yttrium. The determination of the ability is represented by the separation factor of erbium to yttrium since the former is one of the impurities which is present in the yttrium raw material in large amount and is very difficult to separate from yttrium. For example, (2-ethylhexyl)phosphoric acid which is considered to be the most promising for the concentration of yttrium shows a separation factor of approximately 1.1 to 1.2 when used as a solvent and, therefore, cannot be used for the separation of erbium from yttrium.

Table 3 below shows the separation factors obtained by extracting a mixed aqueous solution consisting of equimolar (0.1 mole) yttrium and erbium in the presence of 2 mole ammonium thiocyanate and 3 mole ammonium chloride with a 0.25 mole solvent. As is clear from the table, cyclohexyl-di-n-octylmethyl ammonium salt shows a high separation factor and possesses a superior ability to separate erbium from yttrium.

TABLE 3

| Quaternary Ammonium Salt | Separation Factor |
|---|---|
| 1. Tri-n-octylmethyl ammonium | 7.4 |
| 2. Dodecyl-n-octylbenzylmethyl ammonium | 5.6 |
| 3. Cyclohexyl-di-n-octylmethyl ammonium | 11.9 |

Also, Table 4 below shows the separation factor of cyclohexyl-di-n-octylmethyl ammonium salt in the separation of other heavy rare earths from yttrium. The results indicate that said salt possesses a sufficient ability for use for such a purpose.

TABLE 4

| Impurities | Separation Factor |
|---|---|
| Ytterbium | 69.6 |
| Holmium | 9.22 |
| Dysprosium | 5.61 |

It is clear from the foregoing that the quaternary ammonium salts used in the present invention are excellent solvents for the extraction and removal of heavy rare earth impurities which are difficult to separate by the conventional processes.

To determine the kind of the salting-out agent which should be coexistent in the aqueous phase, a mixed aqueous solution of an equimolar (0.1 mol) yttrium and erbium having dissolved therein one of the various salts is extracted with a solvent, 0.25 mol cyclohexyl-di-n-octylmethyl ammonium chloride diluted with toluene, to obtain the results as shown in Table 5.

TABLE 5

| Co-existent Salt and Concentration Thereof | % Extraction | Separation Factor |
|---|---|---|
| 5M NH$_4$SCN | 62.6 | 10.2 |
| 5M NH$_4$NO$_3$ | 23.6 | 1.92 |
| 5M NH$_4$Cl | 5.67 | 1.49 |
| 3M NaClO$_4$ | 0 | — |
| 2M (NH$_4$)$_2$SO$_4$ | 0 | — |

As is clear from Table 5, the percent extraction and the separation factor can be improved by the co-existence of ammonium thiocyanate, whereas they are not improved by other salts. Also, similar effects are observed in the experiments carried out with a salt of sodium, potassium, etc. of thiocyanic acid. These results indicate that the presence of a thiocyanate ion is necessary to effect the purification of yttrium effectively.

The following explanation is given with regard to a composite solvent comprising the quaternary ammonium salt having added thereto a trialkylphosphine oxide or a triarylphosphine oxide.

Table 6 shows the results obtained by extracting an aqueous solution consisting of an equimolar mixture (0.1 mole) of yttrium and erbium which is a typical impurity found in the yttrium feed solution, at 20° C in the presence of 1 mole ammonium thiocyanate with a single solvent of tri-n-octylmethyl ammonium salt or 1 mole ammonium thiocyanate with a composite solvent consisting of tri-n-octylmethyl ammonium salt and a trialkyl phosphine oxide or a triarylphosphine oxide. In this case, the composite solvent is prepared by diluting the tri-n-octylmethyl ammonium salt with toluene to prepare a 0.5 mole solution thereof which is then mixed with 0.1 mole trialkyl- or triarylphosphine oxide.

As is clear from Table 6, the ability for extraction of the composite solvent containing 0.1 mole trialkyl- or triarylphosphine oxide increases as compared with that of the solvent consisting of the quaternary ammonium salt alone. In addition, the average molecular weight of erbium and yttrium oxide in the resulting aqueous solution is found to be lower than that in the original solution, showing the increased proportion of the yttrium in the resulting solution. Thus, the average molecular weight will be indication of the purification effect. That is, the molecular weight of Y$_2$O$_3$ and Er$_2$O$_3$ are 225.84 and 382.54, respectively, and the average molecular weight before extraction is found to be 302.

TABLE 6

| Solvent | Concentration After Extraction | Average M.W. |
|---|---|---|
| 1. Tri-n-octylmethyl ammonium salt | 0.0637 mole | 272 |
| 2. Tri-n-octylmethyl ammonium salt + Tri-n-octylphosphine oxide | 0.0315 mole | 237 |
| 3. Tri-n-octylmethyl ammonium salt + Tri-(2-ethylhexyl) phosphine oxide | 0.0378 mole | 243 |
| 4. Tri-n-octylmethyl ammonium salt + Triphenylphosphine oxide | 0.0455 mole | 257 |

Table 7 below indicates the total concentration of rare earths remaining in the aqueous phase after extracting a mixed aqueous solution of yttrium and erbium with 0.2 mole tri-n-octylmethyl ammonium salt, or 0.2 mole tri-(2-ethylhexyl)phosphine oxide or a composite solvent prepared by mixing the above two solvents in the equal volume. Since said composite solvent as shown in the experiment No. 3 in Table 7 is a mixture consisting of an equal amount of the solvents No. 1 and No. 2, the concentration of the rare earths extracted thereinto will be the average value obtained in the extractions with the single solvents if there is no synergistic effect between the solvents. Notwithstanding, the results in Table 7 clearly show that the ability of the extraction of the composite solvent is greater than that of each of the single solvents. This result indicates that the synergism is clearly observed between the solvents.

TABLE 7

| Experiment No. | Solvent | Concentration After Extraction |
|---|---|---|
| 1. | Tri-n-octylmethyl ammonium salt | 0.0820 mole |
| 2. | Tri-(2-ethylhexyl)-phosphine oxide | 0.0658 mole |
| 3. | Mixed solvent consisting of the above solvents in equal volume | 0.0596 mole |

The synergistic effect between the quaternary ammonium salt and the trialkylphosphine oxide is also demonstrated by the infra-red spectrum. For example, 0.2 mole tri-n-octylphosphine oxide shows an absorbance at 1160 cm.$^{-1}$ due to P = O, and, when tri-n-octylmethyl ammonium is added thereto, the wave number of the absorbance shifts to the lower side of the wave number. In 0.2 mole tri-n-octylmethyl ammonium salt, an absorbance at 1130 cm.$^{-1}$ due to P = O is observed. From the above observations, it is understood that the solvents are connected to each other at the P = O bond.

Figure 2:
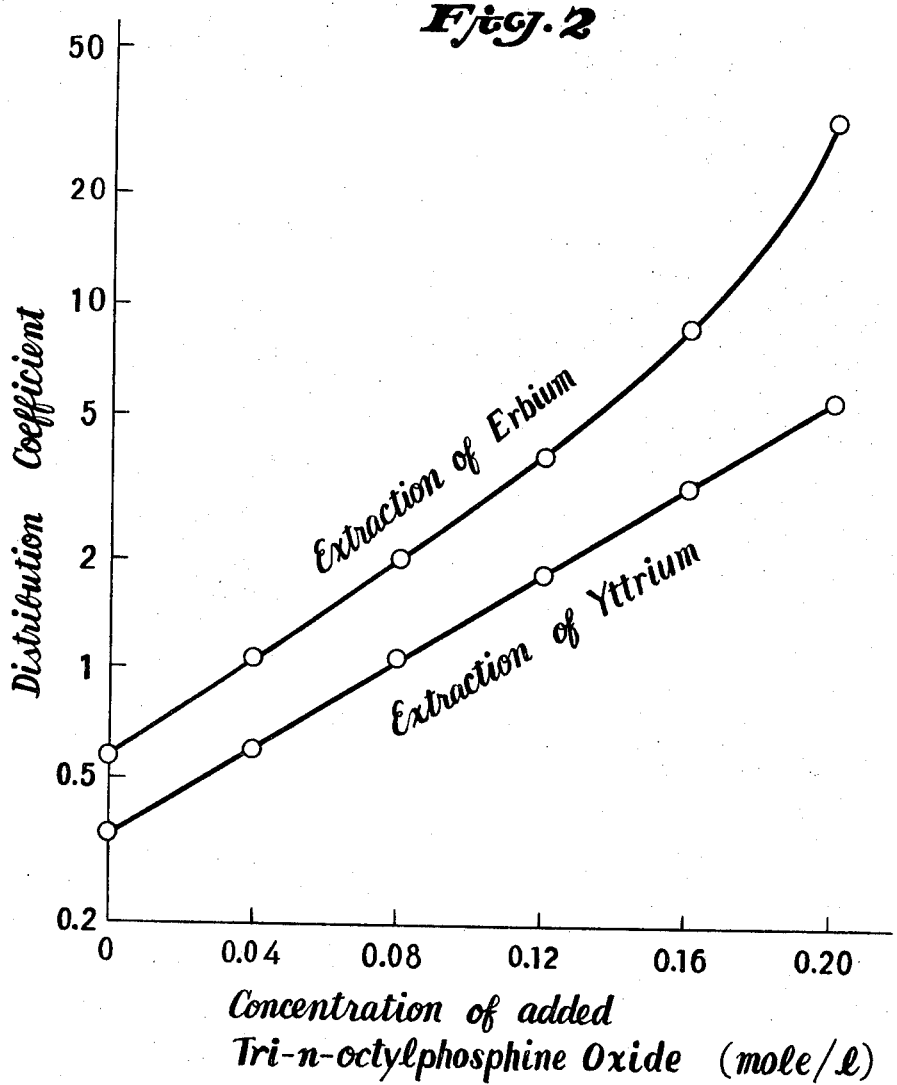
FIG. 2 is a graph showing the relationship between the concentration of tri-n-octylphosphine oxide to be admixed with 0.2 mole tri-n-octylemthyl ammonium salt and the distribution coefficients of erbium and yttrium.

FIG. 2 illustrates the distribution coefficients of erbium and yttrium when the amount of tri-n-octylphosphine oxide to be admixed with 0.2 mole tri-n-octylmethyl ammonium is varied. The aqueous solution contains 0.1 mole yttrium or erbium and 2.0 mole ammonium thiocyanate. As is clear from FIG. 2, the ability of the 0.2 mole quaternary ammonium salt slone to separate rare earths is low, but is increased as the amount of trialkylphosphine oxide added increases. Particularly, the extraction of erbium increases as the amount increases, thereby making the separation of erbium easy.

FIG. 3 illustrates the extracting ability of 0.2 mole tri-n-octylmethyl ammonium salt as compared with that of the composite solvent consisting of 0.2 mole tri-n-octylmethyl ammonium salt and 0.2 mole tri-n-octylphosphine oxide at various concentrations of ammonium thiocyanate. In this experiment, a 0.1 mole aqueous solution of erbium and yttrium is used as a sample to be extracted. As is clear from FIG. 3, the yttrium cannot easily be purified by the extraction with a single solvent having a concentration of 0.2 mole even if the concentration of ammonium thiocyanate is high since the erbium has a low distribution coefficient. However, in case where the composite solvent is used for the extraction, the distribution coefficient of the erbium is surprisingly increased thereby making the removal of the erbium easy.

As an example in which an alkyl phosphine oxide is added for the study of the selectivity for yttrium from erbium, the distribution coefficients and the separation factors of erbium to yttrium obtained by using a composite solvent consisting of 0.1 mole tri-n-octylmethyl ammonium salt having added thereto 0.1 mole tri-n-octylphosphine oxide are shown in Table 8 below. As is seen from this example, both the distribution coefficient and the separation factor increase in said composite solvent thereby making it possible to extract the erbium selectively.

TABLE 8

| Solvent | Distribution Coefficient | Separation Factor |
|---|---|---|
| 1. Single Solvent | 0.227 | 5.36 |
| 2. Composite Solvent | | |
| a. with 0.02M Tri-n-phosphine oxide added | 0.366 | 5.81 |
| b. with 0.04M Tri-n-phosphine oxide added | 0.510 | 6.50 |
| c. with 0.06M Tri-n-phosphine oxide added | 0.688 | 6.31 |
| d. with 0.08M Tri-n-phosphine oxide added | 0.920 | 6.01 |
| e. with 0.10M Tri-n-phosphine oxide added | 1.162 | 6.02 |

The following examples illustrate the present invention but are not to be construed as limiting the scope of the invention.

EXAMPLE 1

A raw material of yttrium having the composition listed in Table 9 below was dissolved in hydrochloric acid together with 0.5 mole ammonium chloride and 2.0 mole ammonium thiocyanate to prepare a feed solution consisting of 0.5 mole aqueous solution of the chloride.

TABLE 9

| Components | % Composition of Crude Yttrium Oxide |
|---|---|
| $Fe_2O_3$ | 0.4 |
| $CeO_2$ | 0.3 |
| $Gd_2O_3$ | 0.1 |
| $Tb_4O_7$ | 0.6 |
| $Dy_2O_3$ | 6.5 |
| $Ho_2O_3$ | 2.0 |
| $Er_2O_3$ | 7.1 |
| $Yb_2O_3$ | 6.7 |
| $Y_2O_3$ | 75.0 |

The thus prepared feed solution, and a solvent comprising 0.5 mole cyclohexyl-di-n-octylmethyl ammonium chloride dissolved in toluene and a scrub solution consisting of an aqueous solution of 2 mole ammonium chloride and 0.5 mole ammonium thiocyanate were then subjected to the simulation of the countercurrent extraction comprising the five theoretical stages as shown in FIG. 1 to purify the yttrium.

The solvent which was fed into the extractor at the right end thereof and caused to flow to the left end while extracting a portion of the yttrium and the rare earth contaminants from the feed solution which was fed into the extractor at the third stage, thus increasing the concentration of the rare earths and the yttrium in said solvent.

On the other hand, the scrub solution which was fed into the extractor at the left end serves to back-extract the yttrium contained in said solvent into the scrub solution thereby leaving the contaminants in the solvent. The scrub solution containing the yttrium is admixed with the feed solution at the third stage. Thus, the solvent containing the rare earth contaminants and only a small amount of yttrium is discharged from the left end of the extractor, while the purified aqueous solution of yttrium is obtained from the right end thereof.

In this manner, yttrium having a 98 percent purity was obtained in 97 percent yield when the feed solution, the solvent and the scrub solution were subjected to the extraction at the flow rate of the ratio 3:4:1.

EXAMPLE 2

A 0.267 mole aqueous solution of yttrium prepared from the purified yttrium obtained in Example 1 which solution also contained 1.3 mole of hydrochloric acid, and a scrub solution consisting of 1.3 mole hydrochloric acid were subjected to the counter-current extraction of the five theoretical stages using 1 mole di-(2-ethylehexyl)phosphate to remove the light rare earths contained in the aqueous solution of yttrium. The resulting yttrium was then used as a raw material for further purification in the same manner as described in Example 1. That is, a solvent consisting of 0.5 mole cyclohexyl-di-n-octylmethyl ammonium chloride, a feed solution consisting of a 0.5 mole aqueous solution of yttrium chloride containing 0.5 mole ammonium chloride and 2.0 mole ammonium thiocyanate, and a scrub solution consisting of an aqueous solution of 2.0 mole of ammonium chloride and 0.5 mole of ammonium thiocyanate were subjected to the counter-current extraction of the five theoretical stages. As the results, highly pure yttrium which appears to have a purity on the order of 99.99 percent was obtained in 88 percent yield.

EXAMPLE 3

Three-hundred ml of an 0.2 mole equimolar aqueous solution of yttrium and erbium which solution also contains 1 mole ammonium thiocyanate was extracted with 150 ml of an aqueous solution of 0.2 mole di-n-oxtylcyclohexyl methyl ammonium salt which was selected as a solvent. The extraction was then repeated in the same manner as above but using a composite solvent system prepared by adding 0.2 mole tri-n-octylphosphine oxide to the above ammonium salt solvent, and the results were compared with those obtained in the extraction using the single solvent. It was found that, in the extraction with the single solvent, the distribution coefficient was 1.028 and the purity of the yttrium was 45.5 percent (calculated as oxide), as compared with 3.43 and 64.7 percent, respectively, in the extraction with the composite solvent.

EXAMPLE 4

The extraction was effected by using the same feed solution in the same volume as that of Example 3 but using n-octyllaurylbenzylmethyl ammonium salt as a quaternary ammonium salt and tri-(2-ethylhexyl)-phosphine oxide as a trialkylphosphine oxide. The results indicated that, in the extraction with the single solvent, the almost no yttrium was extracted as proved by the distribution coefficient of 0.036 nor purified, whereas, in the composite solvent extraction, the distribution coefficient was 1.51 and the purity of the yttrium increased from 43.7 percent to 47.9 percent.

EXAMPLE 5

Four-hundred ml of an aqueous feed solution of 0.2 mole yttrium (mixed rare earths containing 65 percent yttrium, the balance being impurities consisting mainly of heavy rare earths) which also contains 1 mole ammonium thiocyanate was extracted with 150 ml of a single solvent of 0.25 mole tri-n-octylmethyl ammonium salt or 0.25 mole tri-n-octylphosphine oxide, or with 150 ml of a composite solvent consisting of the above two components. The results indicated that the distribution coefficient in the single and composite solvent extractions was 0.389 and 1.00, respectively, and the purity of yttrium oxide in the resulting oxides was 68.9 percent and 78.5 percent, respectively.

What we claimed is:

1. A process for the purification of yttrium which comprises forming a feed solution consisting essentially of an aqueous solution of crude yttrium and heavy rare earth elements, forming a scrub solution consisting essentially of an aqueous solution of ammonium thiocyanate, forming a solvent consisting essentially of quaternary ammonium salt having cyclohexyl radicals, straight chain alkyl radicals and at least one methyl radical but containing no alkyl radical, introducing said solvent solution into one end of an extraction zone while introducing said scrub solution into an opposite end of said extraction zone to effect counter-current contacting of said solutions, introducing said feed solution into the extraction zone and continuing contacting said solutions to extract heavy rare earth elements from the feed solution and into said solvent solution and recovering purified yttrium remaining in the aqueous solution.

2. A process for the purification of yttrium which comprises forming a feed solution consisting essentially of an aqueous solution of crude yttrium and heavy rare earth elements, forming a scrub solution consisting essentially of an aqueous solution of ammonium thiocyanate, forming a solvent consisting essentially of triakylphosphine oxide or triarylphosphine oxide and quaternary ammonium salt having cyclohexyl radicals, straight chain alkyl radicals and at least one methyl radical but containing no alkyl radical, introducing said solvent solution into one end of an extraction zone while introducing said scrub solution into an opposite end of said extraction zone to effect countercurrent contacting of said solutions, introducing said feed solution into the extraction zone and continuing contacting said solutions to extract heavy rare earth elements from the feed solution and into said solvent solution and recovering purified yttrium remaining in the aqueous solution.

* * * * *